United States Patent
Baker et al.

(10) Patent No.: US 10,205,579 B2
(45) Date of Patent: *Feb. 12, 2019

(54) METHODS FOR TRANSMITTING DATA IN A MOBILE SYSTEM AND RADIO STATIONS THEREFOR

(71) Applicant: KONINKLIJKE PHILIPS N.V., Eindhoven (NL)

(72) Inventors: Matthew P. J. Baker, Canterbury (GB); Timothy J. Moulsley, Caterham (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 323 days.

This patent is subject to a terminal disclaimer.

(21) Appl. No.: 14/166,900

(22) Filed: Jan. 29, 2014

(65) Prior Publication Data

US 2014/0146774 A1    May 29, 2014

Related U.S. Application Data

(63) Continuation of application No. 12/438,030, filed as application No. PCT/IB2007/053330 on Aug. 21, 2007, now Pat. No. 8,675,508.

(30) Foreign Application Priority Data

Aug. 22, 2006 (EP) .................................. 06119342

(51) Int. Cl.
  *H04L 5/00* (2006.01)
  *H04B 7/06* (2006.01)
  *H04B 17/24* (2015.01)

(52) U.S. Cl.
  CPC ........... *H04L 5/0057* (2013.01); *H04B 7/063* (2013.01); *H04B 7/0617* (2013.01);
  (Continued)

(58) Field of Classification Search
  None
  See application file for complete search history.

(56) References Cited

U.S. PATENT DOCUMENTS

| | | | |
|---|---|---|---|
| 8,675,508 B2 * | 3/2014 | Baker | .............. H04B 7/0617 370/252 |
| 2002/0018530 A1 * | 2/2002 | Kim | .............. H04B 7/0639 375/267 |

(Continued)

FOREIGN PATENT DOCUMENTS

| | | |
|---|---|---|
| EP | 1879317 A1 | 1/2008 |
| WO | 2006070478 A1 | 7/2006 |

(Continued)

OTHER PUBLICATIONS

3GPP Technical Report 25.876 V1.8.0 (2005), 3rd Generation Partnership Project; Technical Specification Group Radio Access Network; Multiple Input Multiple Output in Utra.

(Continued)

*Primary Examiner* — Mohammad S Adhami

(57) ABSTRACT

The present invention relates to a method for transmitting a plurality of data streams from a primary station to a secondary station on a plurality of transmission beams, said method comprising: at the secondary station measuring the channel quality corresponding to each transmission beam, and signalling at a first rate to the primary station in a first indicator a CQI report representative of the quality of the beams, and signalling at a second rate, greater than the first rate, in a second indicator a number of data streams that can be transmitted on the transmission beams; at the primary station transmitting the data streams on the basis of the first and second indicators.

23 Claims, 1 Drawing Sheet

Use of FBI bits for D-TxAA

(52) U.S. Cl.
CPC ......... *H04B 7/0632* (2013.01); *H04B 7/0634* (2013.01); *H04B 7/0639* (2013.01); *H04B 7/0647* (2013.01); *H04B 7/0697* (2013.01); *H04B 17/24* (2015.01)

(56) References Cited

U.S. PATENT DOCUMENTS

| | | | | |
|---|---|---|---|---|
| 2003/0185309 | A1* | 10/2003 | Pautler | H04B 7/0417 375/257 |
| 2004/0252797 | A1 | 12/2004 | Lee | |
| 2006/0135211 | A1* | 6/2006 | Chae | H01Q 3/26 455/562.1 |
| 2006/0146749 | A1* | 7/2006 | Lundh | H04W 36/02 370/331 |
| 2007/0002963 | A1 | 1/2007 | Pedersen et al. | |
| 2007/0005749 | A1* | 1/2007 | Sampath | H04B 7/0417 709/223 |
| 2007/0032196 | A1* | 2/2007 | Dominique | H04B 17/309 455/67.11 |
| 2007/0070928 | A1 | 3/2007 | Sutivong et al. | |
| 2007/0243831 | A1 | 10/2007 | Seki | |
| 2008/0043867 | A1* | 2/2008 | Blanz | H04B 7/063 375/260 |

FOREIGN PATENT DOCUMENTS

| | | |
|---|---|---|
| WO | 2006126655 A1 | 11/2006 |
| WO | 2007072414 A1 | 6/2007 |

OTHER PUBLICATIONS

3GPP Technical Specification 25.212 V6.8.0 (Jun. 2006), 3rd Generation Partnership Project; Technical Specification Group Radio Access Network; Multiplexing and Channel Coding (FDD) (Release 6).

3GPP Technical Specification 25.214 V6.9.0 3rd Generation Partnership Project; Technical Specification Group Radio Access Network; Physical Layer Procedures (FDD) (Release 6).

* cited by examiner

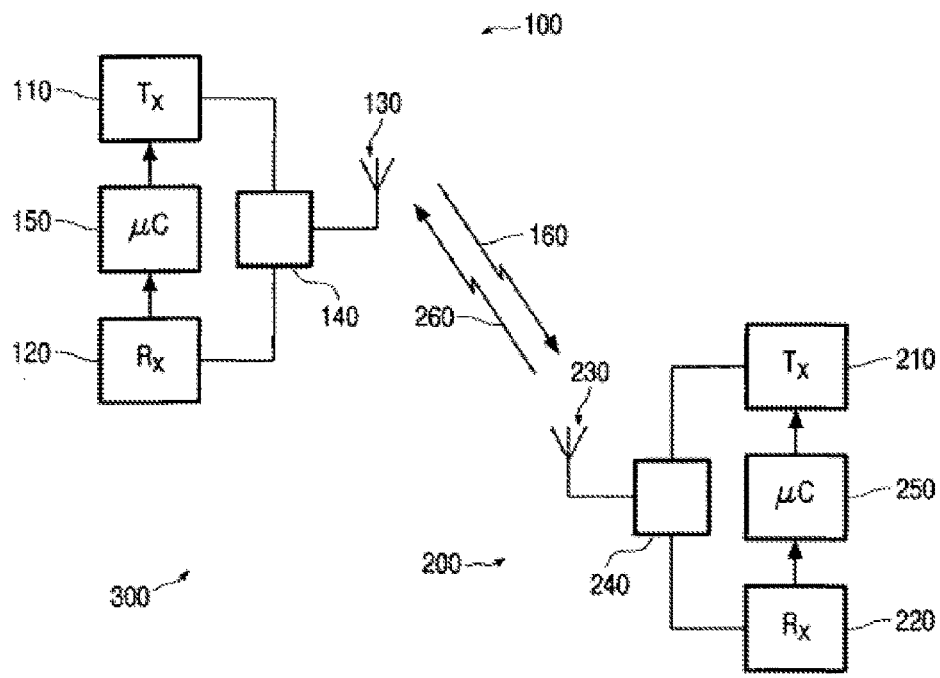
FIG 1
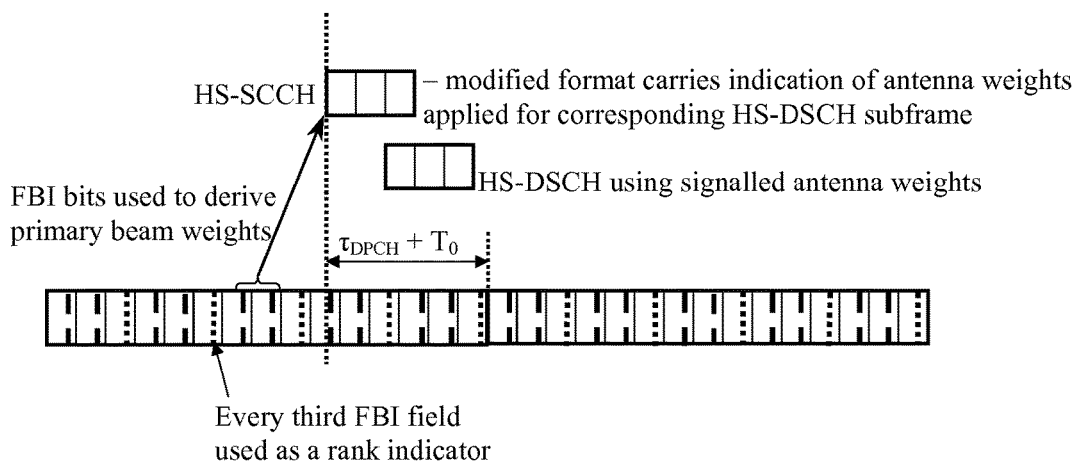
Fig. 2 Use of FBI bits for D-TxAA

METHODS FOR TRANSMITTING DATA IN A MOBILE SYSTEM AND RADIO STATIONS THEREFOR

This application claims the benefit or priority of and describes relationships between the following applications: wherein this application is a continuation of U.S. patent application Ser. No. 12/438,030 filed Feb. 19, 2009, which is the National Stage of International Application No. PCT/IB2007/053330 filed Aug. 21, 2007, which claims the priority of foreign application EP06119342.1 filed Aug. 22, 2006, all of which are incorporated herein in whole by reference.

The present invention relates to a method for transmitting data in a mobile telecommunication system, to a primary station and to a secondary station associated.

This invention is, for example, relevant for the mobile networks like the UMTS, and especially for radio systems with terminals having a plurality of antennas.

The following 3GPP (3rd Generation Partnership Project) documents are incorporated by reference. In particular, they contain details about the terminology used in the present patent application. The documents are publicly available for download from www.3gpp.org.
  a) 3GPP Technical Report 25.876 V1.8.0 (2005-10) "Multiple Input Multiple Output (MIMO) antennas in UTRA", particularly for Double Transmit Antenna Array (D-TxAA).
  b) 3GPP Technical Specification 25.212 "Multiplexing and channel coding (FDD)", particularly for HS-SCCH and DPCCH channel formats.
  c) 3GPP Technical Specification 25.214 "Physical Layer Procedures (FDD)", particularly for Feedback Information (FBI) signalling from UE to BS comprising preferred antenna weights for a BS to use in downlink for closed-loop beamforming. Also for "closed loop mode 1" which is another name for the "TxAA" closed loop beamforming scheme specified in UMTS.

In 3GPP a proposal called D-TxAA for Double Transmit Antenna Array, is under discussion for UMTS as a way of increasing the peak bit rate. This is derived from an existing closed loop transmit diversity scheme (TxAA mode 1) where the mobile terminal signals to the network indicators of complex weights which should be applied to the signals from each of two transmit antennas. In D-TxAA, two different data streams are transmitted using orthogonal weight vectors, one weight vector being based on those transmitted from the mobile terminal, and the other vector being derived deterministically from the first.

For the operation of D-TxAA, the following may be assumed:
  Orthogonal pilot channels are transmitted from each Node B antenna.
  No dedicated (i.e. beamformed) pilots are available (assuming that the fractional dedicated physical channel (F-DPCH) is used, which does not carry pilot bits).
  Feedback information (FBI) for the first beam is derived by the UE and transmitted to Node B, indicating the desired beamforming vector.
  The first beam is transmitted using a restricted code book of weight vectors (for example the codebook currently used for TxAA mode 1).
  The identity of the antenna weight vector for the first beam is signalled to the UE on the High-Speed Shared Control Channel (HS-SCCH).
  The second beam is transmitted using a deterministic phase vector which is typically orthonormal to the vector for the first beam.
  Channel quality information (CQI) is signalled periodically by the UE to the Node B, enabling the Node B to derive a different rate for each of the two beams.
  The CQI indicates the rate (or packet size) which can be transmitted successfully (or with a given probability of success) using a reference power level and code resource (the reference values being known by both network and mobile terminal)
  The transmissions on the two beams are comprised of separate codewords with potentially different rates.

In order for the Node B to determine how many codewords can be simultaneously transmitted, it needs information about how many and which beams can support the transmission of a codeword. Typically this is done by CQI reporting, which also includes information about the supportable rate for each codeword. However, frequent CQI reporting results in a high signalling load. A reduced CQI reporting rate may be used, but the Node B will then be slower to react to changes in the rank of the channel, resulting in failed transmissions of codewords on beams, which cannot support transmission, or wasted capacity when beams are not used which could support a transmission.

It is an object of the invention to propose a method of signalling quickly available resources without causing too much overhead.

It is another object of the invention to propose a method enabling to use all the available resources at any time.

To this end, according to the invention, it is proposed a method for transmitting data from a primary station to a secondary station, on a plurality of data streams, said method comprising:
  at the secondary station measuring the quality of the data streams, and signalling at a first rate to the primary station in a first indicator a CQI report representative of the quality of the data streams, and signalling at a second rate, greater than the first rate, in a second indicator a quantity of data that can be transmitted on the data streams;
  at the primary station transmitting the data streams on the basis of the first and second indicators.

According to the invention, a fast rank indicator is signalled from the secondary station or User Equipment (UE) to the primary station or Node B to enable rapid adjustment of the number of simultaneously-transmitted codewords without requiring CQI to be transmitted every sub-frame. The indicator may only indicate the number of available data streams that can support a codeword. Thus, the size of this indicator is reduced and, even if this indicator is sent very frequently (in each frame or subframe), it does not lead to too much overhead.

As a consequence, this second indicator permits to have a flexible control of the number of codewords allocated to the set of datastreams, preventing thus the wasting of capacity, or problems of transmissions.

The present invention also relates to a method for transmitting a plurality of data streams from a primary station to a secondary station on a plurality of transmission beams, said method comprising:
  at the secondary station measuring the channel quality corresponding to each transmission beam, and signalling to the primary station a plurality of antenna weights;
  at the primary station computing at least a first transmission beam on the basis of the plurality of antenna weights, and transmitting the data streams on the transmission beams including the first transmission beam.

These and other aspects of the invention will be apparent from and will be elucidated with reference to the embodiments described hereinafter.

The present invention will now be described in more detail, by way of example, with reference to the accompanying drawings, wherein:

FIG. 1 is a block diagram of a system comprising a primary station and a secondary station in accordance with the invention;

FIG. 2 is a time chart representing the channel format in accordance with an embodiment of the invention.

The present invention relates to a system of communication 300 as depicted in FIG. 1, comprising a primary station 100, like a base station, and at least one secondary station 200 like a mobile station. More specifically, this invention can be applied in multi-antenna communication systems, and in particular, potential application is foreseen in the MIMO feature currently being standardised for UMTS Release 7.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna array 130, including at least two antennas, by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230, or to an antenna array, by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a first channel 160 and transmission from the secondary radio station 200 to the first radio station 100 takes place on a second channel 260.

The first channel 160 takes place on a plurality of transmission beams. These transmission beams may be steered to be directed along at least one direction preferred by the secondary station 200. To signal the quality of the transmission beams, CQI reports are transmitted periodically. Typically, such CQI reports may indicate the quality of the beams, or a rate (or packet size) which can be transmitted successfully for each data streams.

According to the invention, a fast rank indicator is signalled from the secondary station 200 to primary station 100 to enable rapid adjustment of the number of simultaneously-transmitted codewords or data streams without requiring CQI to be transmitted every sub-frame. This fast rank indicator is coded with a low number of bits, so that the frequent transmission of this indicator does not lead to too much overhead. As illustrated on FIG. 2, this indicator may be transmitted every subframe. On the other hand, the CQI reports may not be transmitted so often, and could be transmitted for instance every four subframes, or even less often, so that it reduces the overhead.

In an embodiment, the fast rank indicator is time-multiplexed with antenna weight feedback, by observing that the relationship between the size of the codebook (and therefore the number of bits required for antenna weight feedback) and the length of the subframe (and therefore the number of physical channel bits available for transmitting antenna weight feedback) may result in one or more spare bit-positions which can be used for transmitting the fast rank indicator.

Indeed, In RAN1#45 and RAN#32, it was agreed that the MIMO scheme for Re1-7 would be a dual-codeword MIMO scheme based on D-TxAA, with the antenna weights being signalled on the HS-SCCH.

Hereafter, the term "primary beam" will be used to designate the beam that is formed on the basis of the secondary station 200 feedback. The beam that is formed using an orthogonal weight vector to that of the first beam is referred to as the "secondary beam". However, it is possible that this secondary beam is formed with help on a second feedback from the secondary station or for instance on a spatial measurement of the noise.

With D-TxAA, the primary beam is configured according to the feedback from the UE in a similar way to the beamforming for closed-loop mode 1. A criterion for D-TxAA feedback may be chosen, so that the criterion for calculating the FBI feedback bits would allow the possibility of maximising the received SIR. This would allow the secondary station 200 with more than one receive antenna the possibility of taking into account the spatial character-istics of any strong interferer(s). In the case of spatially-white interference, this change would make no difference, but it would be especially useful in the case when the strongest eigenvector of the channel from the serving Node B happens to coincide with a strong path from an interferer. However, in a variant of the invention, it is possible to choose the feedback so that the "received power" is maxi-mised. In order to allow the secondary stations to reuse existing algorithms, this change could be optional—i.e. allowing one of two behaviours for the secondary station (either maximising power or maximising SIR).

Concerning the signalling of feedback bits, in order to keep as much commonality as possible with the existing closed loop mode 1, it seems reasonable to use the DPCCH FBI bits for the secondary station 200 to transmit its preferred antenna weight information to the primary station 100. The fact that these bits are uncoded and may have a high error rate should have less impact than for closed loop mode 1, as the signalling of the antenna weights on the HS-SCCH should be more reliable than any antenna verification scheme implemented at the secondary station.

Some changes are, however, necessary compared to closed loop mode 1. Firstly, as the antenna weights will be signalled on the HS-SCCH in the downlink, it can be advantageous that the antenna weights in the downlink are fixed for the duration of an HS-DSCH subframe. This would also aid channel estimation and decoding in the secondary station.

This means that 3 UpLink DPCCH FBI bits are available per HS-DSCH TTI (or 6 depending on the DPCCH slot format).

It is necessary to consider the exact usage of these FBI bits, and also the calculation of the phase vector at the Node B. In closed loop mode 1, an averaging operation is employed to calculate the actual beamforming weight vector to apply at the Node B based on the FBI messages received in two consecutive slots.

A number of possibilities exist for the exact way in which the FBI bits are used and the primary beam phase vector calculated. For example:

1. Keep the definition of the FBI message exactly as in closed loop mode 1, with a $\pi/2$ rotation per slot and require that Node B calculates the primary beam antenna weights as an average of 2 slots. The code book used by the Node B would remain exactly as in closed loop mode 1. As the HS-DSCH subframe is 3 slots, this means that the FBI bit(s) in 1 slot out of every 3 would serve no purpose. Therefore this bit is available for uplink signalling. For example, it could be used as a fast "rank indicator", to indicate to the Node B whether the second beam is able to support a second codeword or not.

2. Keep the definition of the FBI message exactly as in closed loop mode 1, with a π/2 rotation per slot, but require that the Node B calculates the primary beam antenna weights as an average of 3 slots. This would have the effect of doubling the size of the Node B code book, and adding 1 more bit to the HS-SCCH signalling.

Indeed, in a variant of the invention, the secondary station may signal to the primary station the complex weights for building the primary beam, with help of a plurality of antenna weights. The primary station constructs the primary beam by deducing it from the plurality of weights, for instance by averaging the complex weights.

For example, the primary station is able to compute the primary by deriving an average from 3 antenna weights, doubling thus the size of the primary station codebook, and adding one bit available for the signaling.

3. Keep the definition of the FBI message exactly as in closed loop mode 1, with a π/2 rotation per slot, but leave the Node B free to use any method to calculate the primary beam antenna weights. The codebook of weights used for beamforming could be the same as the current codebook for closed loop mode 1, or be extended by additional entries, or be a different codebook. This may be incompatible with some Node B architectures.

4. Redefine the usage of the FBI bits, and use repetition across the 3 available bits per subframe. This would minimise the number of FBI bits required per slot, and gain maximum advantage from time-diversity. However, the time delay between the UE's CPICH phase measurement and the application of the antenna weights on HS-DSCH would increase. Furthermore, restricting the beam rotation to ±π/2 between each HS-DSCH subframe would be unlikely to fit the channel conditions.

5. Redefine the usage of the FBI bits, and use a simple code to allow the UE to request any of the 4 possible phase vectors. These could, for example, be coded as 0 0 0, 0 1 1, 1 1 0, 1 0 1, with a distance of 2 bits between each codeword. This overcomes the restriction of the ±π/2 rotation for option 4, but still has the disadvantage of the higher time delay than options 1 or 2.

This is illustrated in the timing diagram of FIG. 2.

The criterion for calculating the FBI feedback bits should allow the possibility of maximising the received SIR, not the "received power" as currently specified in TS25.214 for closed loop mode 1.

The antenna weights in the downlink are fixed for the duration of an HS-DSCH subframe.

The basic definition of the FBI bits, averaging at the Node B, and the codebook may be kept as in closed loop mode 1, and the redundant third FBI field is used as a fast rank indicator.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A secondary station comprising:
a receiver configured to simultaneously receive a plurality of data streams from a primary station on a respective plurality of transmission beams,
a sensor configured to detect indications of channel quality of the transmission beams, and
processing circuitry configured to compute antenna weight feedback information based on channel quality of each transmission beam, and
a transmitter configured to signal at a first rate to the primary station in a first indicator a Channel Quality Information (CQI) report representative of the quality of the plurality of transmission beams, and to signal at a second rate to the primary station, greater than the first rate, in a second indicator a number of data streams that can be transmitted on the transmission beams, wherein the second indicator is multiplexed with the antenna weight feedback information.

2. The secondary station of claim 1, wherein the second indicator indicates which transmission beams among the plurality of transmission beams can support a data stream.

3. The secondary station of claim 1, wherein the transmission beams are transmitted using orthogonal weight vectors.

4. The secondary station of claim 1, wherein the first rate equals zero.

5. The secondary station of claim 1, wherein the transmitter is configured to transmit to the primary station characteristics of a first transmission beam.

6. The secondary station of claim 5, wherein the transmission of the characteristics of the first transmission beam comprises transmitting two indications of antenna weights included in two respective slots, and wherein the second indicator is coded in a third slot.

7. The secondary station of claim 1, wherein the second indicator indicates a number of available data streams that can support a code word, whereby a number of simultaneously transmitted codewords can be rapidly adjusted without requiring channel quality information to be transmitted every subframe, and whereby a flexible control of a number of codewords allocated to the plurality of data streams is permitted.

8. The secondary station of claim 1, wherein the sensor detects an indication of quality of each respective transmission beam and the CQI report represents the quality of each respective transmission beam.

9. A primary station comprising
a transmitter configured to simultaneously transmit a plurality of data streams to a secondary station on a respective plurality of transmission beams,
a receiver configured to receive a first indicator from the secondary station, sent at a first rate, the first indicator including a Channel Quality Information (CQI) report representative of the quality of the plurality of transmission beams, and to receive a second Indicator from the secondary station, sent at a second rate, greater than the first rate, the second indicator being representative of a number of data streams that can be simultaneously transmitted on the transmission beams, the first and second indicators being sent at periodic or intermittent times; and wherein the receiver is configured to receive antenna feedback information that is multiplexed with the second indicator, the antenna weight feedback information having been computed by the secondary station based on channel quality of each transmission beam of the plurality of transmission beams.

10. The primary station of claim 9, wherein the second indicator indicates which transmission beams among the plurality of transmission beams can support a data stream.

11. The primary station of claim 9, wherein the transmission beams are transmitted using orthogonal weight vectors.

12. The primary station of claim 9, wherein the receiver is configured to receive at the primary station characteristics of a first transmission beam, and compute the characteristics of other transmission beams from the characteristics of the first transmission beam.

13. The primary station of claim 12, wherein receiving characteristics of the first transmission beam comprises receiving two indications of antenna weights included in two respective slots, and wherein the second indicator is coded in a third slot.

14. A method for transmitting a plurality of data streams from a primary station to a secondary station, the method comprising:
simultaneously transmitting, by the primary station, a plurality of data streams to a secondary station on respective plurality of transmission data beams,
receiving at the secondary station simultaneously receiving the plurality of data streams from the respective plurality of transmission beams,
sensing at the secondary station measuring an indication of channel quality corresponding to each transmission beam,
computing, at the secondary station, antenna weight feedback information based on channel quality of each transmission beam,
signaling, by the secondary station, at a first rate to the primary station in a first indicator a Channel Quality information (CQI) report representative of the quality of the plurality of transmission beams, and signaling to the primary station at a second rate, greater than the first rate, in a second indicator a number of data streams that can be transmitted on the transmission beams, and
receiving at the primary station the first and second indicators, wherein the second indicator is multiplexed with the antenna weight feedback information.

15. A system for transmitting a plurality of data streams from a primary station to a secondary station, the system comprising:
a primary station comprising a transmitter configured to simultaneously transmit a plurality of data streams to a secondary station on respective transmission data beams,
the secondary station comprising:
a receiver of the secondary station simultaneously receiving the plurality of data streams,
a sensor configured to detect an indication of channel quality corresponding to each transmission beam,
processing circuitry configured to compute antenna weight feedback information based on channel quality of each transmission beam, and
a transmitter configured to signal at a first rate to the primary station in a first indicator a Channel Quality information (CQI) report representative of the quality of the beams, and to signal at a second rate, greater than the first rate, in a second indicator a number of data streams that can be transmitted on the transmission beams, wherein the second indicator is multiplexed with the antenna weight feedback information,
the primary station comprising:
a receiver of the primary station receiving the first and second indicators,
the transmitter of the primary station adjusting the transmission of the data streams depending on the first and second indicators.

16. A method for a secondary station to receive a plurality of data streams from a primary station, the method comprising:
a simultaneously receiving a plurality of data streams from a primary station on a respective plurality of transmission beams,
detecting an indication of channel quality corresponding to each transmission beam,
computing antenna weight feedback information based on channel quality of each transmission beam, and
signaling at a first rate to the primary station in a first indicator a Channel Quality Information (CQI) report representative of the quality of the plurality of transmission beams, and signaling at a second rate to the primary station, greater than the first rate, in a second indicator a number of data streams that can be transmitted on the transmission beams, wherein the second indicator is multiplexed with the antenna weight feedback information.

17. A method for a primary station to transmit a plurality of data streams to a secondary station, the method comprising:
a transmitter simultaneously transmitting a plurality of data streams to a secondary station on a respective plurality of transmission beams,
a receiver receiving a first indicator, sent at a first rate, the first indicator Including a Channel Quality Information (CQI) report representative of the quality of the plurality of transmission beams, and a second indicator, sent at a second rate, greater than the first rate, the second indicator being representative of a number of data streams that can be simultaneously transmitted on the transmission beams, the first and second indicators being received at periodic or intermittent times; and
wherein the receiver is configured to receive antenna feedback information that is multiplexed with the second indicator, the antenna weight feedback information having been computed by the secondary station based on channel quality of each transmission beam of the plurality of transmission beams.

18. The secondary station of claim 1, wherein the secondary station is based on a Universal Mobile Telecommunications System (UMTS) and the Channel Quality Information (CQI) report is indicative of the quality of the signals on a High Speed Downlink Shared Channel (HS-DSCH).

19. The primary station of claim 9, wherein the secondary station is based on a Universal Mobile Telecommunications System (UMTS) and the Channel Quality Information (CQI) report is indicative of the quality of the signals on a High Speed Downlink Shared Channel (HS-DSCH).

20. The method of claim 14, wherein the secondary station is based on a Universal Mobile Telecommunications System (UMTS) and the Channel Quality Information (CQI) report is indicative of the quality of the signals on a High Speed Downlink Shared Channel (HS-DSCH).

21. The system of claim 15, wherein the secondary station is based on a I Universal Mobile Telecommunications System (UMTS) and the Channel Quality Information (CQI) report is indicative of the quality of the signals on a High Speed Downlink Shared Channel (HS-DSCH).

22. The method of cam 16, wherein the secondary station is based on a Universal Mobile Telecommunications System (UMTS) and the Channel Quality information (CQI) report is indicative of the quality of the signals on a High Speed Downlink Shared Channel (HS-DSCH).

23. The method of claim 17, wherein the secondary station is based on a Universal Mobile Telecommunications System (UMTS) and the Channel Quality information (CQI) report is indicative of the quality of the signals on a High Speed Downlink Shared Channel (HS-DSCH).

* * * * *